(12) United States Patent
Wright

(10) Patent No.: US 11,145,192 B1
(45) Date of Patent: Oct. 12, 2021

(54) TRAFFIC SENSING ALARM ASSEMBLY

(71) Applicant: Brian Wright, Newaygo, MI (US)

(72) Inventor: Brian Wright, Newaygo, MI (US)

( * ) Notice: Subject to any disclaimer, the term of this patent is extended or adjusted under 35 U.S.C. 154(b) by 0 days.

(21) Appl. No.: 17/094,353

(22) Filed: Nov. 10, 2020

(51) Int. Cl.
| | | |
|---|---|---|
| *G08G 1/01* | (2006.01) | |
| *G08G 1/005* | (2006.01) | |
| *G08B 3/10* | (2006.01) | |
| *G01S 13/04* | (2006.01) | |
| *G01S 13/931* | (2020.01) | |
| *G08G 1/09* | (2006.01) | |

(52) U.S. Cl.
CPC .............. *G08G 1/005* (2013.01); *G01S 13/04* (2013.01); *G01S 13/931* (2013.01); *G08B 3/10* (2013.01); *G08G 1/094* (2013.01)

(58) Field of Classification Search
CPC .......... G08G 1/005; G08G 1/094; G08B 3/10; G01S 13/931; G01S 13/04
See application file for complete search history.

(56) References Cited

U.S. PATENT DOCUMENTS

| | | | |
|---|---|---|---|
| 5,231,393 A | 7/1993 | Strickland | |
| 5,760,686 A | 6/1998 | Toman | |
| D399,261 S | 10/1998 | Humphrey | |
| 7,030,777 B1 | 4/2006 | Nelson | |
| 8,193,936 B2 * | 6/2012 | Houston | .......... G08B 13/19695 340/556 |
| 8,237,555 B2 | 8/2012 | McCarthy | |
| 9,488,741 B2 * | 11/2016 | Takagi | ................... A61B 6/482 |
| 9,489,841 B1 | 11/2016 | Huggins | |
| 2005/0104764 A1 * | 5/2005 | Young | ..................... G01S 13/04 342/27 |
| 2017/0154524 A1 * | 6/2017 | Beaulieu | ............... H04W 4/023 |
| 2019/0259256 A1 | 8/2019 | Fairweather | |
| 2021/0065530 A1 * | 3/2021 | Fairweather | ............. G08B 7/06 |

FOREIGN PATENT DOCUMENTS

WO    WO9522130    8/1995

* cited by examiner

*Primary Examiner* — Phung Nguyen

(57) ABSTRACT

A traffic sensing alarm assembly includes a motion sensing unit that emits a focused beam of electromagnetic energy to detect a vehicle that passes through the focused beam. The motion sensing unit broadcasts an alert signal when the focused beam is interrupted. A first mount is removably attachable to the motion sensing unit to engage an edge of a road sign. A second mount is removably attachable to the motion sensing unit to rest on a dashboard of a service vehicle that is parked on a roadside. An attachment is removably coupled to the motion sensing unit to engage a rear view mirror on the service vehicle. A remote alert is worn on a service worker's clothing and the remote alert is in wireless communication with the motion sensing unit. The remote alert emits an audible alarm when the motion sensing unit broadcasts the alert signal to alert the service worker to the potential hazard of oncoming traffic.

18 Claims, 9 Drawing Sheets

TRAFFIC SENSING ALARM ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to traffic alarm devices and more particularly pertains to a new traffic alarm device for alerting a roadside service worker of approaching traffic.

(2) Description of Related Art Including Information Disclosed Under 37 CFR 1.97 and 1.98

The prior art relates to traffic alarm devices that are incorporated into construction cones that have been strategically placed on a roadway and a standalone alert unit for alerting a worker to approaching traffic. The prior art does not disclose a radar emitting device that can be placed on a road sign, or on a service vehicle, and that is in wireless communication with an alert device that is worn on a roadside service worker to alert the roadside service worker to approaching traffic.

BRIEF SUMMARY OF THE INVENTION

An embodiment of the disclosure meets the needs presented above by generally comprising a motion sensing unit that emits a focused beam of electromagnetic energy to detect a vehicle that passes through the focused beam. The motion sensing unit broadcasts an alert signal when the focused beam is interrupted. A first mount is removably attachable to the motion sensing unit to engage an edge of a road sign. A second mount is removably attachable to the motion sensing unit to rest on a dashboard of a service vehicle that is parked on a roadside. An attachment is removably coupled to the motion sensing unit to engage a rear view mirror on the service vehicle. A remote alert is worn on a service worker's clothing and the remote alert is in wireless communication with the motion sensing unit. The remote alert emits an audible alarm when the motion sensing unit broadcasts the alert signal to alert the service worker to the potential hazard of oncoming traffic.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
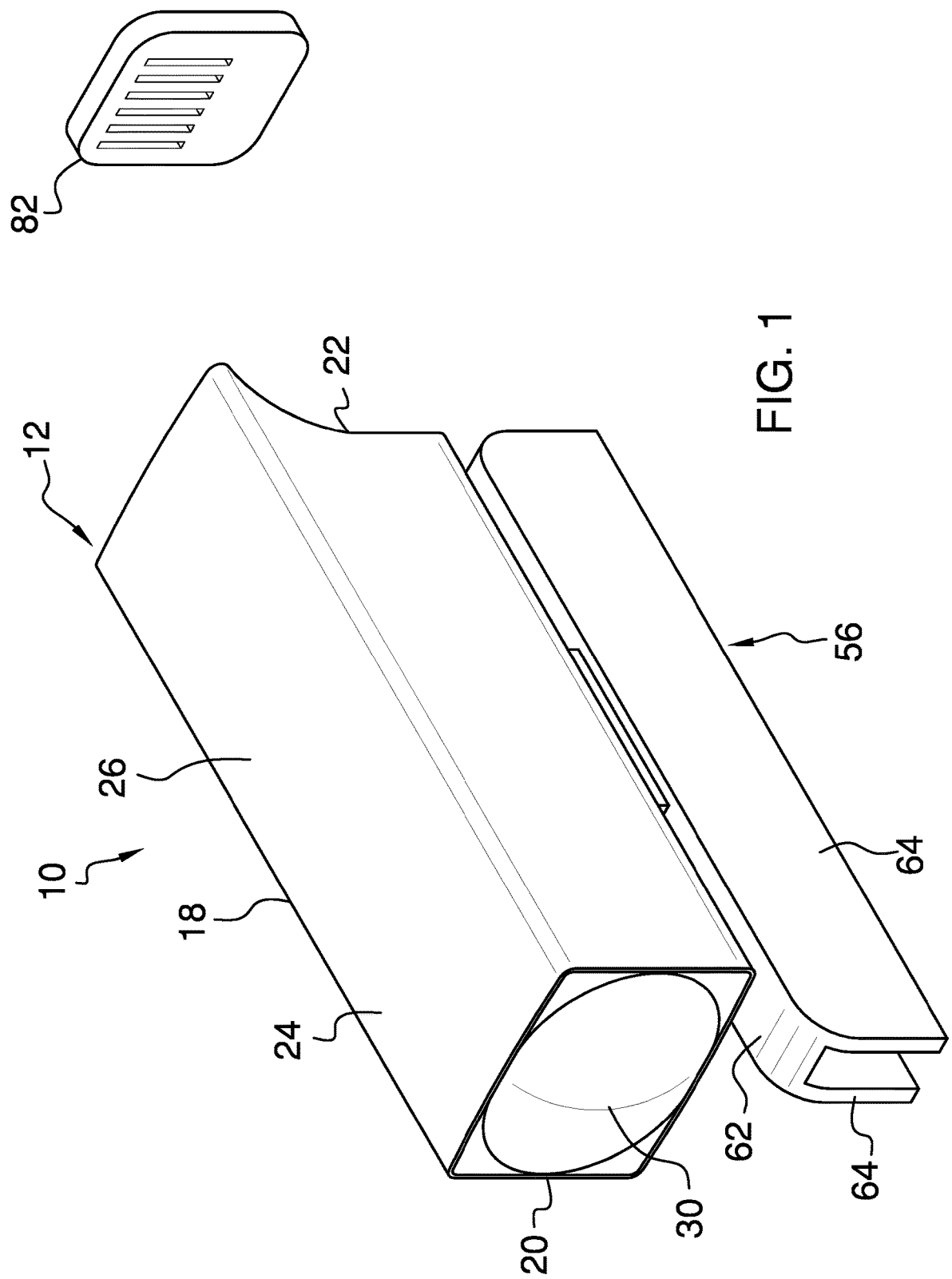
FIG. 1 is a perspective view of an embodiment of the disclosure.
Figure 2:
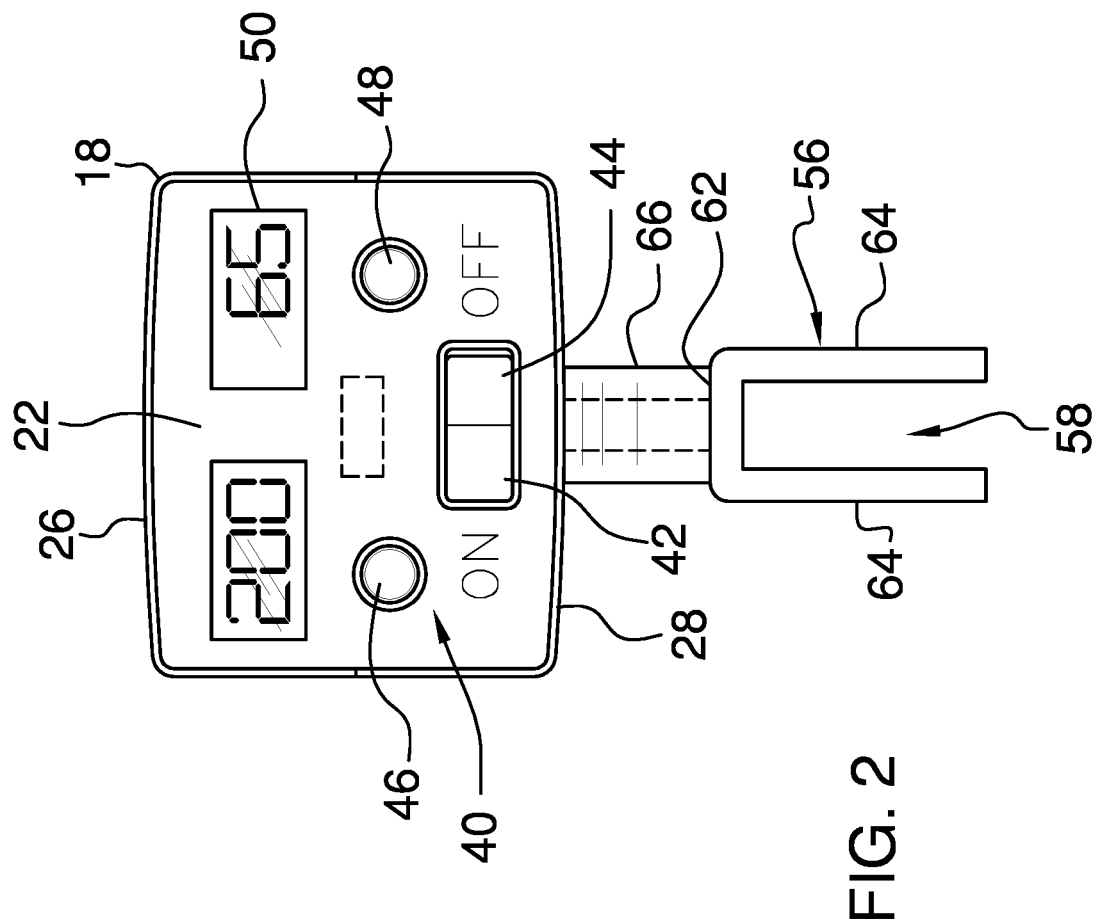
FIG. 2 is a back view of a motion sensing unit and a first mount of an embodiment of the disclosure.
Figure 3:
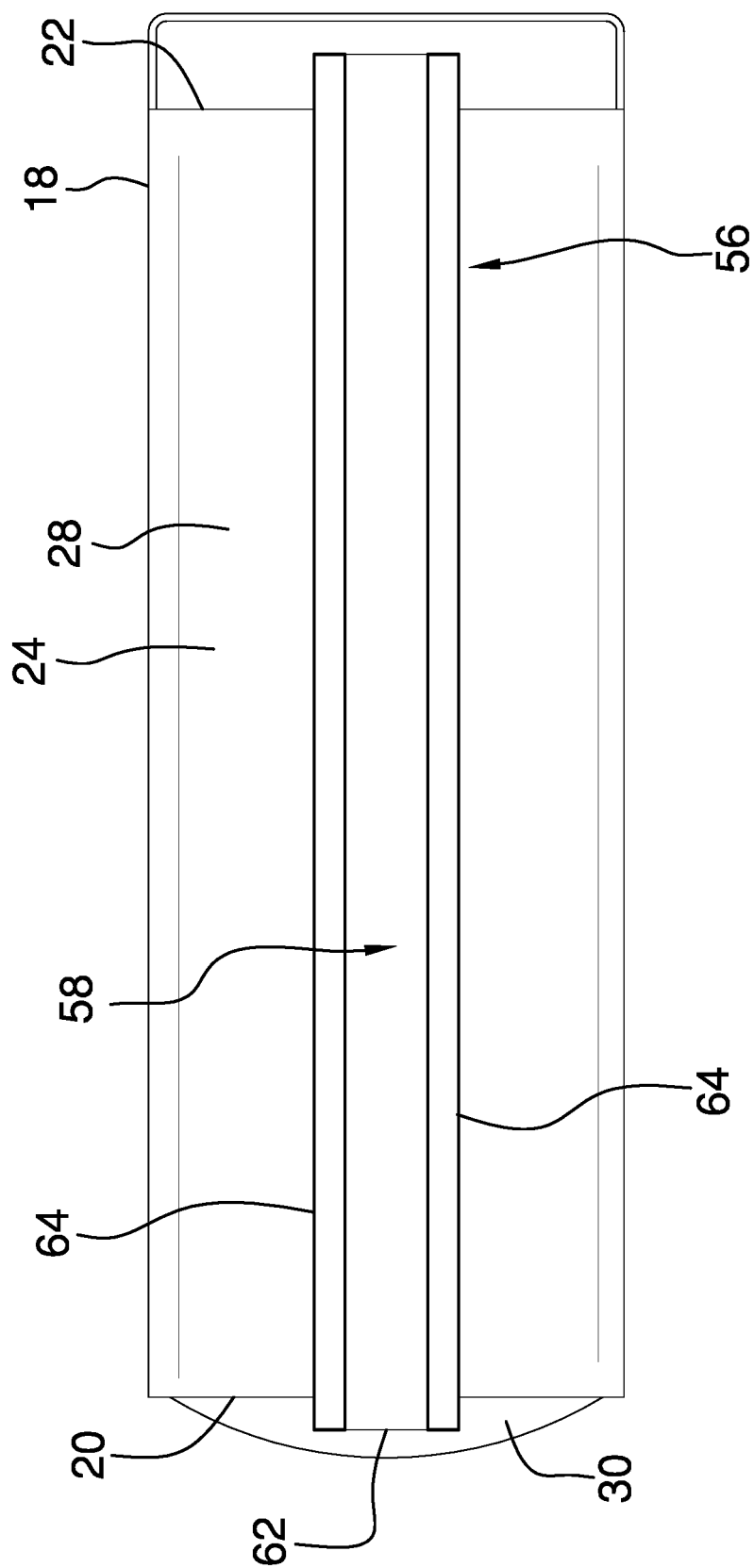
FIG. 3 is a bottom view of a motion sensing unit and a first mount of an embodiment of the disclosure.
Figure 4:
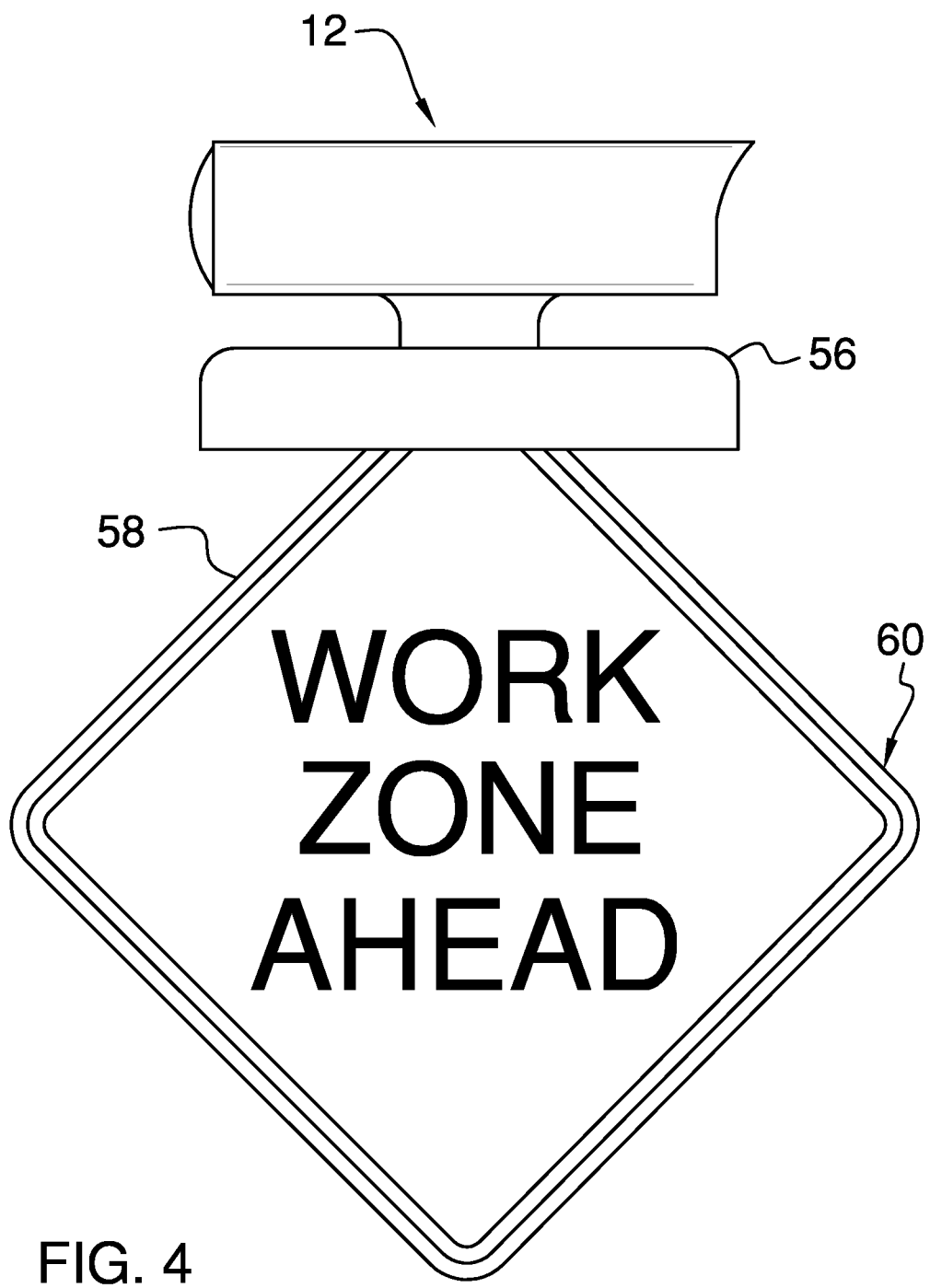
FIG. 4 is a perspective view of an embodiment of the disclosure showing a motion sensing unit being positioned on a road sign.
Figure 5:
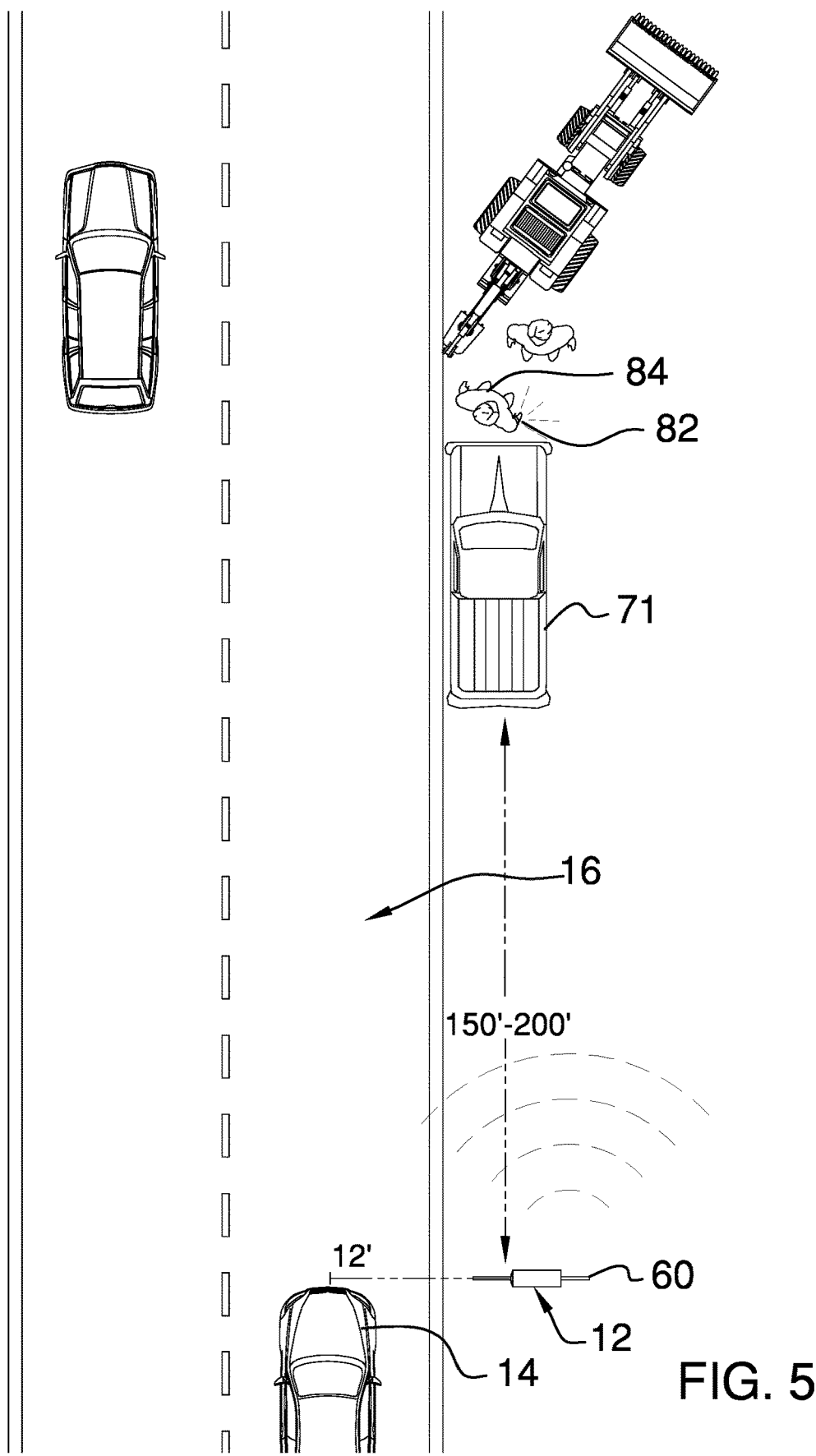
FIG. 5 is a perspective in-use view of an embodiment of the disclosure showing a motion sensing unit being positioned on a road sign.
Figure 6:
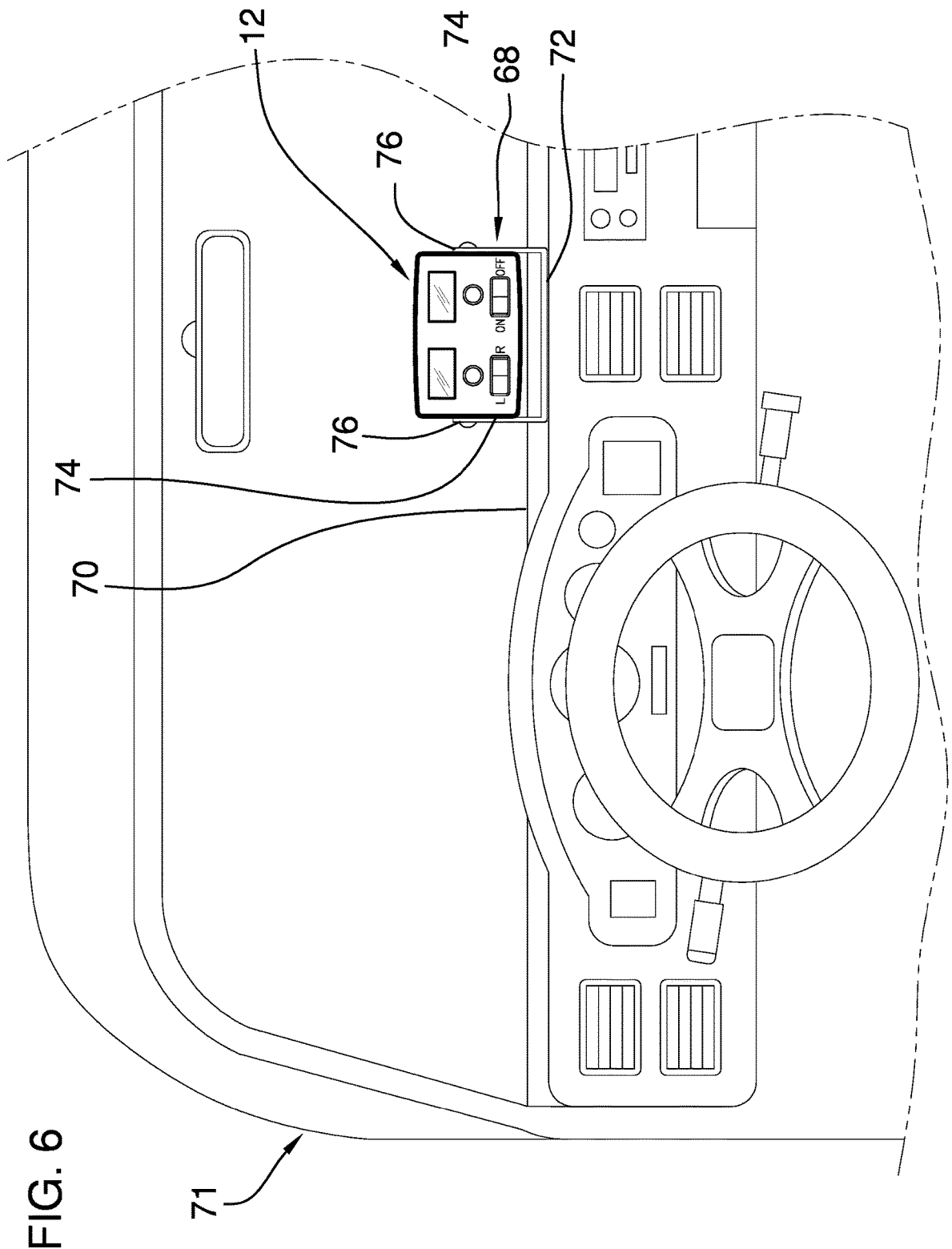
FIG. 6 is an interior in-use view of an embodiment of the disclosure showing a motion sensing unit being positioned on a dashboard of a service vehicle.
Figure 7:
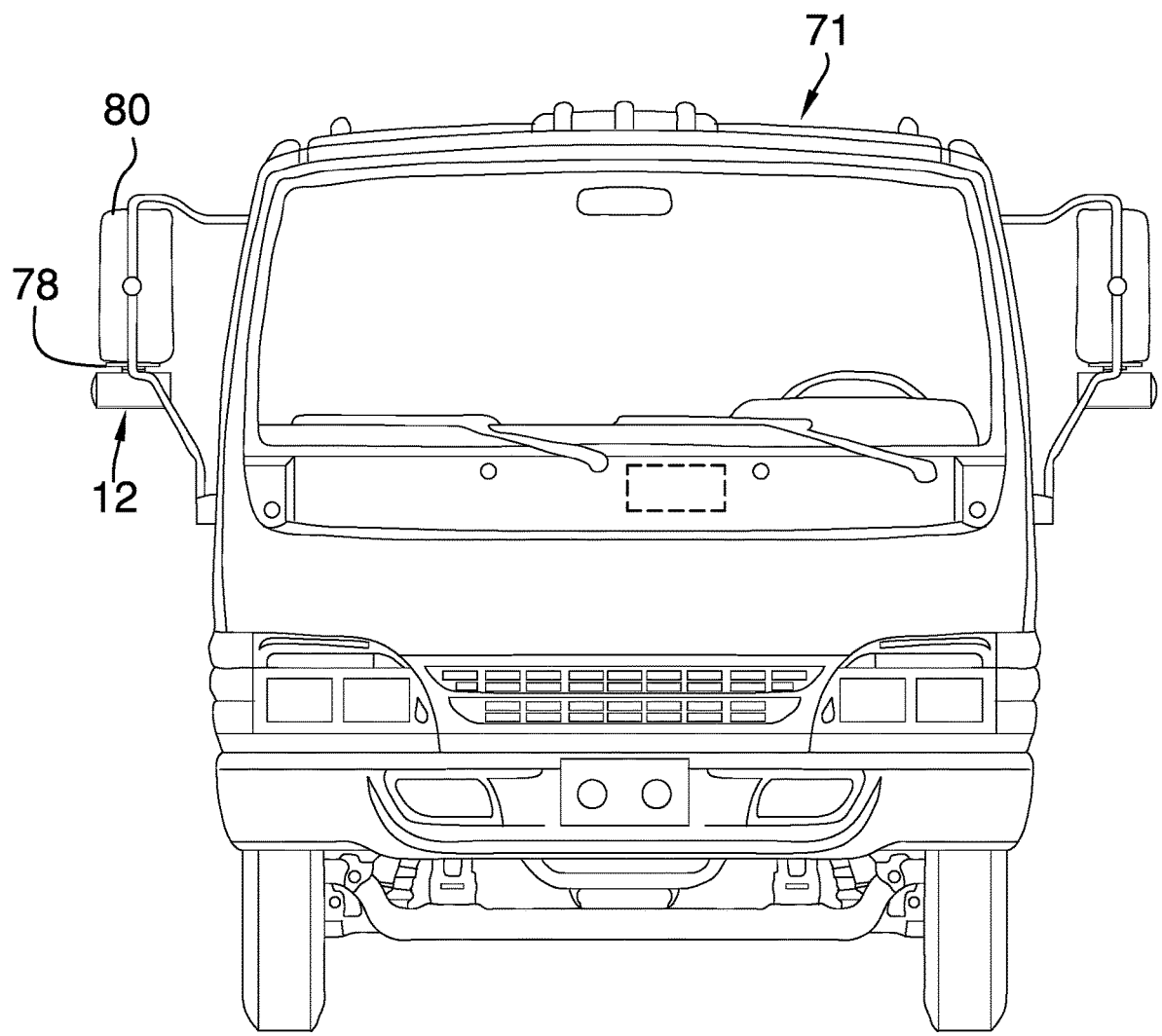
FIG. 7 is a perspective in-use view of an embodiment of the disclosure showing a motion sensing unit being suspended from a rear view mirror of a service vehicle.
Figure 8:
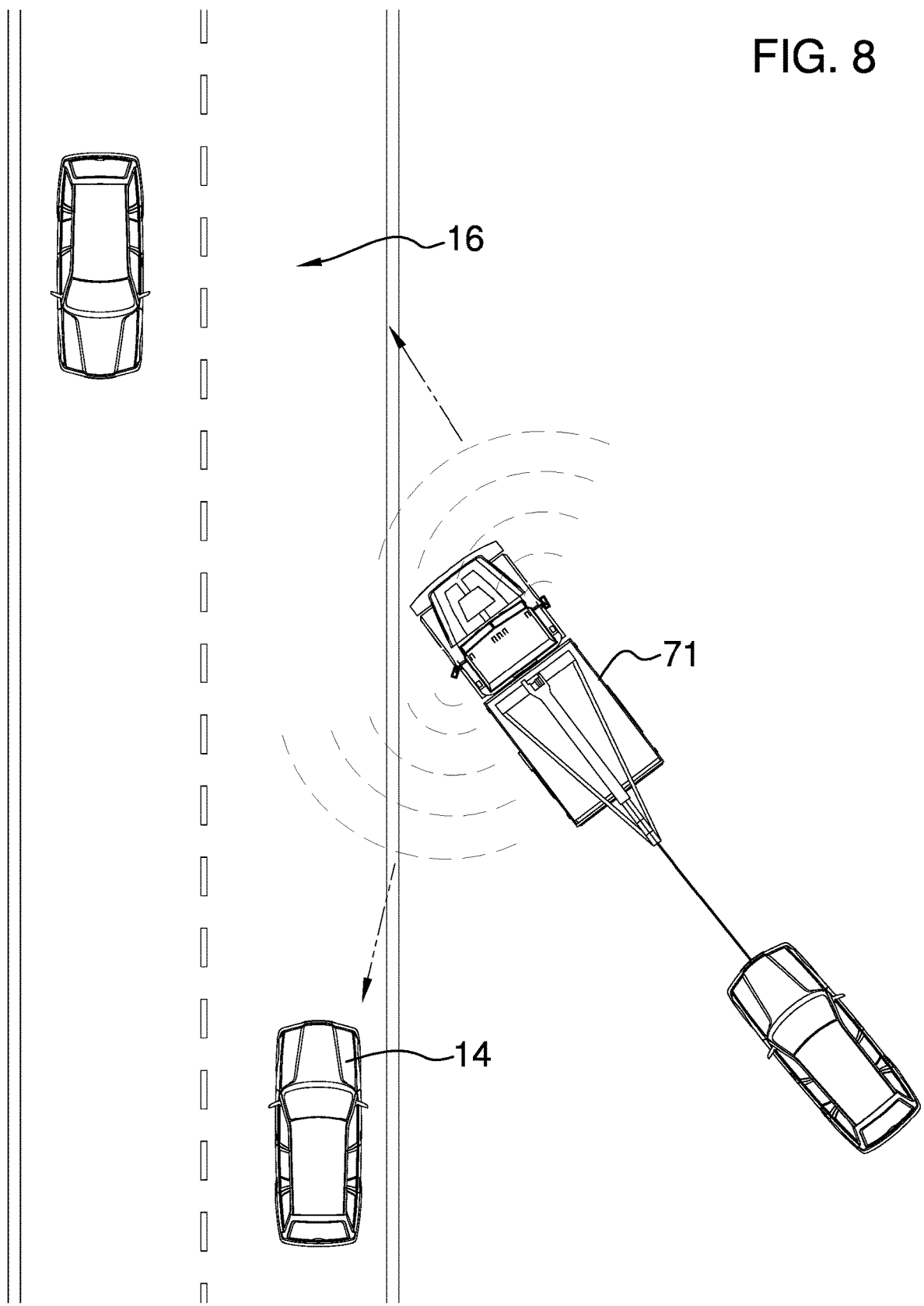
FIG. 8 is a perspective in-use view of an embodiment of the disclosure showing a motion sensing unit being positioned on a rear view mirror of a service vehicle.
Figure 9:
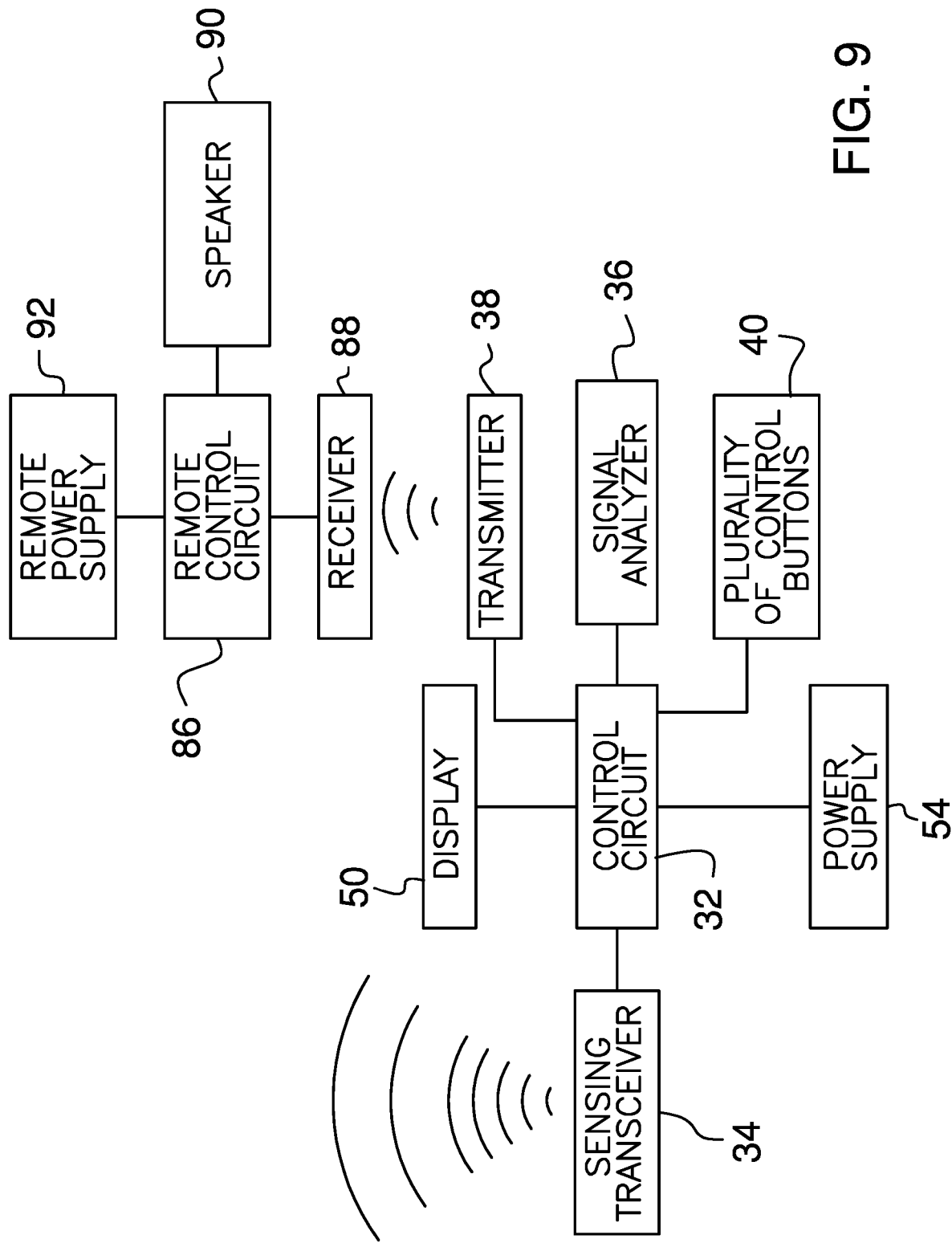
FIG. 9 is a schematic view of an embodiment of the disclosure.

With reference now to the drawings, and in particular to FIGS. 1 through 9 thereof, a new traffic alarm device embodying the principles and concepts of an embodiment of the disclosure and generally designated by the reference numeral 10 will be described.

As best illustrated in FIGS. 1 through 9, the traffic sensing alarm assembly 10 generally comprises a motion sensing unit 12 that emits a focused beam of electromagnetic energy when the motion sensing unit 12 is turned on. In this way the motion sensing unit 12 can detect a vehicle 14, or other object that can reflect electromagnetic radiation, that passes through the focused beam. Moreover, the motion sensing unit 12 broadcasts an alert signal when the focused beam is interrupted. The motion sensing unit 12 can be employed by a tow truck driver, for example, or other roadside service worker that is commonly working on the side of a roadway 16 that has vehicular traffic.

The motion sensing unit 12 comprises a housing 18 that has a first end 20, a second end 22 and an outer wall 24 extending therebetween, and the outer wall 24 has a top side 26 and a bottom side 28. The housing 18 is elongated between the first end 20 and the second end 22, and the first end 20 is open. A lens 30 is coupled to the first end 20 and the lens 30 is comprised of a translucent material to pass electromagnetic energy therethrough. Additionally, the lens 30 has a convex profile to focus electromagnetic energy into a focused beam extending away from the first end 20 of the housing 18.

The motion sensing unit 12 includes a control circuit 32 that is positioned in the housing 18 and the control circuit 32 receives an alert input. The motion sensing unit 12 includes a sensing transceiver 34 that is positioned within the housing 18 and the sensing transceiver 34 is aligned with the lens 30. The sensing transceiver 34 emits a sensing signal through the lens 30 such that the sensing signal is focused into a beam. The control circuit 32 receives the alert input when the sensing signal is reflected back to the sensing transceiver 34 by a reflective object, such as the metal body panels of a vehicle 14 that is travelling on the roadway 16. In this way the sensing transceiver 34 can detect a vehicle 14 passing through the sensing beam. The sensing transceiver 34 may comprise a radio frequency transceiver or the like and the sensing transceiver 34 may have an operational frequency ranging between approximately 300.0 MHz and 15.0 GHz.

The motion sensing unit 12 includes a signal analyzer 36 that is positioned in the housing 18 and the signal analyzer 36 is electrically coupled to the control circuit 32. The signal analyzer 36 analyzes the signal strength of the sensing signal that is reflected back to the sensing transceiver 34. Additionally, the control circuit 32 receives the alert input when the signal analyzer 36 determines that the signal strength of the sensing signal which is reflected back to the sensing transceiver 34 exceeds a pre-determined signal threshold. The motion sensing unit 12 includes a transmitter 38 that is positioned in the housing 18 and the transmitter 38 is electrically coupled to the control circuit 32. The transmitter 38 broadcasts an alarm signal when the control circuit 32 receives the alert input. Moreover, the transmitter 38 may comprise a radio frequency transmitter or the like.

The motion sensing unit 12 includes a plurality of control buttons 40 that is each movably integrated into the second end 22 of the housing 18 such that the plurality of control buttons 40 can be manipulated by a user. Each of the control buttons 40 is electrically coupled to the control circuit 32 and the plurality of control buttons 40 includes a power on button 42, a power off button 44, a sensitivity increase button 46 and a sensitivity decrease button 48. The power on button 42 turns on the control circuit 32, the sensing transceiver 34, the transmitter 38 and the signal analyzer 36. The power off button 44 turns off the control circuit 32, the sensing transceiver 34, the transmitter 38 and the signal analyzer 36.

The sensitivity increase button 46 increases the signal threshold of the sensing signal analyzed by the signal analyzer 36. In this way distance at which the sensing transceiver 34 can detect the vehicle 14 is decreased. Conversely, the sensitivity decrease button 48 decreases the signal threshold of the sensing signal analyzed by the signal analyzer 36. In this way the distance at which the sensing transceiver 34 can detect the vehicle 14 is increased.

The motion sensing unit 12 includes a display 50 that is coupled to the second end 22 of the housing 18 such that the display 50 is configured to be visible to a user. The display 50 is electrically coupled to the control circuit 32 and the display 50 displays indicia 52 comprising numbers to communicate a distance in feet which corresponds to the signal threshold set by the sensitivity increase button 46 and the sensitivity decrease button 48. The display 50 may comprise an LED or other type of electronic display. A power supply 54 is positioned in the housing 18, the power supply 54 is electrically coupled to the control circuit 32 and the power supply 54 comprises at least one battery.

A first mount 56 is provided and the first mount 56 is removably attachable to the motion sensing unit 12. The first mount 56 has a slot 58 integrated therein to engage an edge 58 of a road sign 60 thereby facilitating the motion sensing unit 12 to be directed toward oncoming traffic with respect to the road sign 60. The first mount 56 has a first wall 62 extending between a pair of second walls 64. The second walls 64 are spaced apart from each other and are oriented perpendicular to the first wall 62 such that the first mount 56 has a u-shape. In this way the slot 58 is defined to extend between the second walls 64 to receive the edge 58 of the road sign 60. A swivel 66 is provided and the swivel 66 is rotatably coupled to the first mount 56 and the swivel 66 releasably engages the bottom side 28 of the outer wall 24 of the housing 18 of the motion sensing unit 12. In this way the first end 20 of the housing 18 can be pointed toward the oncoming traffic with respect to the road sign 60.

A second mount 68 is provided and the second mount 68 is removably attachable to the motion sensing unit 12. The second mount 68 is planar such that the second mount 68 can rest on a dashboard 70 of a service vehicle 71 that is parked on a roadside 16 thereby facilitating the motion sensing unit 12 to be directed toward oncoming traffic with respect to the service vehicle 71. The second mount 68 has a plate 72 extending between a pair of uprights 74 and each of the uprights 74 has a distal end 76 with respect to the plate 72. Additionally, each of the uprights 74 releasably engages the outer wall 24 of the housing 18 for attaching the housing 18 to the second mount 68. In this way the first end 20 of the housing 18 can be directed toward oncoming traffic with respect to the service vehicle 71.

An attachment 78 is provided that is removably coupled to the motion sensing unit 12 and which can engage a rear view mirror 80 on the service vehicle 71. In this way the motion sensing unit 12 can be directed toward oncoming traffic with respect to the service vehicle 71. The attachment 78 rotatably engages the top side 26 of the outer wall 24 of the housing 18 thereby facilitating the housing 18 to be suspended from the rear view mirror 80.

A remote alert 82 is provided that can be worn on a service worker's 84 clothing and the remote alert 82 is in wireless communication with the motion sensing unit 12. Additionally, the remote alert 82 emits an audible alarm when the motion sensing unit 12 broadcasts the alert signal. In this way the remote alert 82 can alert the service worker 84 to the potential hazard of oncoming traffic. The remote alert 82 comprises a remote control circuit 86 that is integrated into the remote alert 82 and the remote control circuit 86 receives an alarm input.

The remote alert 82 includes a receiver 88 that is integrated into the remote alert 82. The receiver 88 is electrically coupled to the remote control circuit 86 and the receiver 88 is in wireless communication with the transmitter 38 associated with the motion sensing unit 12. The receiver 88 receives the alarm signal from the transmitter 38 and the remote control circuit 86 receives the alarm input when the receiver 88 receives the alarm signal from the transmitter 38. The remote alert 82 includes a speaker 90 that is integrated into the remote alert 82 to emit an audible alarm outwardly therefrom. The speaker 90 is electrically coupled to the remote control circuit 86 and the speaker 90 is turned on when the remote control circuit 86 receives the alarm input. The remote alert 82 includes a remote power supply 92 that is integrated into the remote alert 82, the remote power supply 54 is electrically coupled to the remote control circuit 86 and the remote power supply 92 comprises at least one battery.

In use, the first mount 56 is attached to the housing 18 to facilitate the housing 18 to be positioned on top of a road sign 60 that is positioned a desired distance away from the service vehicle 71 and the housing 18 is rotated to direct the first end 20 toward the lane of traffic to which the service vehicle 71 is adjacently parked. Additionally, either the sensitivity increase button 46 or the sensitivity decrease button 48 is depressed to facilitate the remote alert 82 to only be actuated by traffic that is travelling in the lane of traffic to which the service vehicle 71 is adjacently parked. In this way the user can be notified of oncoming traffic that could potentially strike the user or the service vehicle 71 if the driver of the oncoming traffic is distracted. The second mount 68 can be attached to the housing 18 for mounting the housing 18 on the dashboard, or the attachment 78 can be attached to the housing 18 for suspending the housing 18 from the rear view mirror 80 of the vehicle 14, depending on which is most appropriate for the environment in which the service vehicle 71 is operating.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A traffic sensing alarm assembly for emitting an audible alert when traffic approaches a roadside service vehicle thereby alerting a roadside worker to a potential hazard of approaching traffic, said assembly comprising:
    a motion sensing unit emitting a focused beam of electromagnetic energy when said motion sensing unit is turned on wherein said motion sensing unit is configured to detect a vehicle that passes through said focused beam, said motion sensing unit broadcasting an alert signal when said focused beam is interrupted;
    a first mount being removably attachable to said motion sensing unit, said first mount having a slot being integrated therein wherein said first mount is configured to engage an edge of a road sign thereby facilitating said motion sensing unit to be directed toward oncoming traffic with respect to the road sign;
    a second mount being removably attachable to said motion sensing unit, said second mount being planar wherein said second mount is configured to rest on a dashboard of a service vehicle that is parked on a roadside thereby facilitating said motion sensing unit to be directed toward oncoming traffic with respect to the service vehicle;
    an attachment being removably coupled to said motion sensing unit wherein said attachment is configured to engage a rear view mirror on the service vehicle thereby facilitating said motion sensing unit to be directed toward oncoming traffic with respect to the service vehicle; and
    a remote alert being configured to be worn on a service worker's clothing, said remote alert being in wireless communication with said motion sensing unit, said remote alert emitting an audible alarm when said motion sensing unit broadcasts said alert signal wherein said remote alert is configured to alert the service worker to the potential hazard of oncoming traffic.

2. The assembly according to claim 1, wherein said motion sensing unit comprises a housing having a first end, a second end and an outer wall extending therebetween, said outer wall having a top side and a bottom side, said housing being elongated between said first end and said second end, said first end being open.

3. The assembly according to claim 2, wherein said motion sensing unit includes a lens being coupled to said first end, said lens being comprised of a translucent material wherein said lens is configured to pass electromagnetic energy therethrough, said lens having a convex profile wherein said lens is configured to focus electromagnetic energy into a focused beam extending away from said first end of said housing.

4. The assembly according to claim 2, wherein said motion sensing unit includes a control circuit being positioned in said housing, said control circuit receiving an alert input.

5. The assembly according to claim 4, wherein said motion sensing unit includes a sensing transceiver being positioned within said housing, said sensing transceiver being aligned with said lens, said sensing transceiver emitting a sensing signal through said lens such that said sensing signal is focused into a beam, said control circuit receiving said alert input when said sensing signal is reflected back to said sensing transceiver by a reflective object wherein said sensing transceiver is configured to detect the vehicle passing through said sensing beam.

6. The assembly according to claim 5, wherein said motion sensing unit includes a signal analyzer being positioned in said housing, said signal analyzer being electrically coupled to said control circuit, said signal analyzer analyzing a signal strength of said sensing signal that is reflected back to said sensing transceiver, said control circuit receiving said alert input when said signal analyzer determines that the signal strength of said sensing signal that is reflected back to said sensing transceiver exceeds a pre-determined signal threshold.

7. The assembly according to claim 6, wherein:
    said motion sensing unit includes a plurality of control buttons, each of said control buttons being movably integrated into said second end of said housing wherein said plurality of control buttons is configured to be manipulated by a user, each of said control buttons being electrically coupled to said control circuit, said control buttons including a power on button, a power off button, a sensitivity increase button and a sensitivity decrease button;

said power on button turns on said control circuit, said sensing transceiver and said signal analyzer;

said power off button turns off said control circuit, said sensing transceiver and said signal analyzer;

said sensitivity increase button increases the signal threshold of said sensing signal analyzed by said signal analyzer; and said sensitivity decrease button decreases the signal threshold of said sensing signal analyzed by said signal analyzer.

8. The assembly according to claim 7, wherein said motion sensing unit includes a display being coupled to said second end of said housing wherein said display is configured to be visible to the user, said display being electrically coupled to said control circuit, said display displaying indicia comprising numbers communication a distance in feet that corresponds to the signal threshold set by said sensitivity increase button and said sensitivity decrease button.

9. The assembly according to claim 4, wherein said motion sensing unit includes a transmitter being positioned in said housing, said transmitter being electrically coupled to said control circuit, said transmitter broadcasting an alarm signal when said control circuit receives said alert input.

10. The assembly according to claim 4, wherein said motion sensing unit includes a power supply being positioned in said housing, said power supply being electrically coupled to said control circuit, said power supply comprising at least one battery.

11. The assembly according to claim 2, wherein said second mount has a plate extending between a pair of uprights, each of said uprights having a distal end with respect to said plate, each of said uprights releasably engaging said outer wall of said housing for attaching said housing to said second mount thereby facilitating said first end of said housing to be directed toward oncoming traffic with respect to the service vehicle.

12. The assembly according to claim 1, wherein said first mount has a first wall extending between a pair of second walls, said second walls being spaced apart from each other and being oriented perpendicular to said first wall such that said first mount has a u-shape defining said slot extending between said second walls wherein said slot is configured to receive the edge of the road sign.

13. The assembly according to claim 12, wherein:
said motion sensing unit includes a housing having an outer wall and a first end, said outer wall having a bottom side; and
said assembly includes a swivel being rotatably coupled to said first mount, said swivel releasably engaging a bottom side of said outer wall of said housing of said motion sensing unit wherein said first end of said housing is configured to be pointed toward the oncoming traffic with respect to the road sign.

14. The assembly according to claim 1, wherein said remote alert comprises a remote control circuit being integrated into said remote alert, said remote control circuit receiving an alarm input.

15. The assembly according to claim 14, wherein:
said motion sensing unit includes a transmitter, said transmitter broadcasting an alarm signal; and
said remote alert includes a receiver being integrated into said remote alert, said receiver being electrically coupled to said remote control circuit, said receiver being in wireless communication with said transmitter associated with said motion sensing unit, said receiver receiving said alarm signal from said transmitter, said remote control circuit receiving said alarm input when said receiver receives said alarm signal from said transmitter.

16. The assembly according to claim 14, further comprising a speaker being integrated into said remote alert wherein said speaker is configured to emit the audible alarm outwardly therefrom, said speaker being electrically coupled to said remote control circuit, said speaker being turned on when said remote control circuit receives said alarm input.

17. The assembly according to claim 14, further comprising a remote power supply being integrated into said remote alert, said remote power supply being electrically coupled to said remote control circuit, said remote power supply comprising at least one battery.

18. A traffic sensing alarm assembly for emitting an audible alert when traffic approaches a roadside service vehicle thereby alerting a roadside worker to a potential hazard of approaching traffic, said assembly comprising:

a motion sensing unit emitting a focused beam of electromagnetic energy when said motion sensing unit is turned on wherein said motion sensing unit is configured to detect a vehicle that passes through said focused beam, said motion sensing unit broadcasting an alert signal when said focused beam is interrupted, said motion sensing unit comprising:

a housing having a first end, a second end and an outer wall extending therebetween, said outer wall having a top side and a bottom side, said housing being elongated between said first end and said second end, said first end being open;

a lens being coupled to said first end, said lens being comprised of a translucent material wherein said lens is configured to pass electromagnetic energy therethrough, said lens having a convex profile wherein said lens is configured to focus electromagnetic energy into a focused beam extending away from said first end of said housing;

a control circuit being positioned in said housing, said control circuit receiving an alert input;

a sensing transceiver being positioned within said housing, said sensing transceiver being aligned with said lens, said sensing transceiver emitting a sensing signal through said lens such that said sensing signal is focused into a beam, said control circuit receiving said alert input when said sensing signal is reflected back to said sensing transceiver by a reflective object wherein said sensing transceiver is configured to detect the vehicle passing through said sensing beam;

a signal analyzer being positioned in said housing, said signal analyzer being electrically coupled to said control circuit, said signal analyzer analyzing a signal strength of said sensing signal that is reflected back to said sensing transceiver, said control circuit receiving said alert input when said signal analyzer determines that the signal strength of said sensing signal that is reflected back to said sensing transceiver exceeds a pre-determined signal threshold;

a transmitter being positioned in said housing, said transmitter being electrically coupled to said control circuit, said transmitter broadcasting an alarm signal when said control circuit receives said alert input;

a plurality of control buttons, each of said control buttons being movably integrated into said second end of said housing wherein said plurality of control buttons is configured to be manipulated by a user, each of said control buttons being electrically coupled to said control circuit, said control buttons including a power on button, a power off button, a sensitivity increase button and a sensitivity decrease button, said power on button turning on said control circuit, said sensing transceiver, said transmitter and said signal analyzer, said power off button turning off said control circuit, said sensing transceiver, said transmitter and said signal analyzer, said sensitivity increase button increasing the signal threshold of said sensing signal analyzed by said signal analyzer, said sensitivity decrease button decreasing the signal threshold of said sensing signal analyzed by said signal analyzer;

a display being coupled to said second end of said housing wherein said display is configured to be visible to the user, said display being electrically coupled to said control circuit, said display displaying indicia comprising numbers communication a distance in feet that corresponds to the signal threshold set by said sensitivity increase button and said sensitivity decrease button; and a power supply being positioned in said housing, said power supply being electrically coupled to said control circuit, said power supply comprising at least one battery;

a first mount being removably attachable to said motion sensing unit, said first mount having a slot being integrated therein wherein said first mount is configured to engage an edge of a road sign thereby facilitating said motion sensing unit to be directed toward oncoming traffic with respect to the road sign, said first mount having a first wall extending between a pair of second walls, said second walls being spaced apart from each other and being oriented perpendicular to said first wall such that said first mount has a u-shape defining said slot extending between said second walls wherein said slot is configured to receive the edge of the road sign;

a swivel being rotatably coupled to said first mount, said swivel releasably engaging said bottom side of said outer wall of said housing of said motion sensing unit wherein said first end of said housing is configured to be pointed toward the oncoming traffic with respect to the road sign;

a second mount being removably attachable to said motion sensing unit, said second mount being planar wherein said second mount is configured to rest on a dashboard of a service vehicle that is parked on a roadside thereby facilitating said motion sensing unit to be directed toward oncoming traffic with respect to the service vehicle, said second mount having a plate extending between a pair of uprights, each of said uprights having a distal end with respect to said plate, each of said uprights releasably engaging said outer wall of said housing for attaching said housing to said second mount thereby facilitating said first end of said housing to be directed toward oncoming traffic with respect to the service vehicle;

an attachment being removably coupled to said motion sensing unit wherein said attachment is configured to engage a rear view mirror on the service vehicle thereby facilitating said motion sensing unit to be directed toward oncoming traffic with respect to the service vehicle, said attachment rotatably engaging said top side of said outer wall of said housing wherein said housing is configured to be suspended from the rear view mirror; and a remote alert being configured to be worn on a service worker's clothing, said remote alert being in wireless communication with said motion sensing unit, said remote alert emitting an audible alarm when said motion sensing unit broadcasts said alert signal wherein said remote alert is configured to alert the service worker to the potential hazard of oncoming traffic, said remote alert comprising:

a remote control circuit being integrated into said remote alert, said remote control circuit receiving an alarm input;

a receiver being integrated into said remote alert, said receiver being electrically coupled to said remote control circuit, said receiver being in wireless communication with said transmitter associated with said motion sensing unit, said receiver receiving said alarm signal from said transmitter, said remote control circuit receiving said alarm input when said receiver receives said alarm signal from said transmitter;

a speaker being integrated into said remote alert wherein said speaker is configured to emit the audible alarm outwardly therefrom, said speaker being electrically coupled to said remote control circuit, said speaker being turned on when said remote control circuit receives said alarm input; and a remote power supply being integrated into said remote alert, said remote power supply being electrically coupled to said remote control circuit, said remote power supply comprising at least one battery.

* * * * *